US005566348A

United States Patent [19]
Dahman et al.

[11] Patent Number: 5,566,348
[45] Date of Patent: Oct. 15, 1996

[54] SYSTEM FOR ADAPTIVELY OPTIMIZING AUTOMATED OPTICAL LIBRARY MANAGEMENT

[75] Inventors: Kirby G. Dahman; Kenneth F. Day III; Alfredo M. Diaz; Edward R. Morse II, all of Tucson, Ariz.

[73] Assignee: International Business Machines Corporation, Armonk, N.Y.

[21] Appl. No.: 965,113

[22] Filed: Oct. 22, 1995

[51] Int. Cl.$^6$ .................................................. G06F 12/08
[52] U.S. Cl. .................. 395/838; 395/650; 369/34; 364/DIG. 1; 364/243.4; 364/243.2; 364/271.5; 364/270.5
[58] Field of Search .................................. 395/275, 650, 395/837, 835, 838, 856; 369/34

[56] References Cited

U.S. PATENT DOCUMENTS

| | | | |
|---|---|---|---|
| 4,077,059 | 2/1978 | Cordi et al. | 364/200 |
| 4,271,489 | 6/1981 | Siryj et al. | 369/38 |
| 4,527,262 | 7/1985 | Manto | 369/33 |
| 4,614,474 | 9/1986 | Sudo | 414/281 |
| 4,654,727 | 3/1987 | Blum et al. | 360/71 |
| 4,766,581 | 8/1988 | Korn et al. | 369/30 |
| 4,845,614 | 7/1989 | Hanawa et al. | 395/275 |
| 4,864,438 | 9/1989 | Munro | 360/92 |
| 4,864,511 | 9/1989 | Moy et al. | 364/478 |
| 4,987,533 | 1/1991 | Clark et al. | 364/200 |
| 5,121,483 | 6/1992 | Monaham et al. | 395/275 |
| 5,197,055 | 3/1993 | Hartung et al. | 369/34 |
| 5,239,650 | 8/1993 | Hartung et al. | 395/650 |

OTHER PUBLICATIONS

"Optical Library Dataserver Model 3995–151" by the ITSC; *IBM Storage Subsystem Enhancements*; Jul. 1992, pp. 105–146.

*Primary Examiner*—Thomas C. Lee
*Assistant Examiner*—D. Dinh
*Attorney, Agent, or Firm*—Baker, Maxham, Jester & Meador

[57] ABSTRACT

A method for managing Data Storage Medium (DSM) mount and demount decisions in an automated data storage library that dynamically optimizes both sequential and random data access workloads. The demount decisions adapt to time-varying characteristics in the relative workload mix. When the workload is primarily sequential, the mount and demount decision procedure favors longer mount residency for sequential access streams, reducing the robotic picker activity and reducing response time for mount requests. When the workload is predominantly random access, sequentially accessed DSM residency time is generally reduced and preemptive demounts are more readily implemented. The disclosed method provides for preemptive demounts and uses a two-element decision process to select either a Least Recently Used (LRU) or a Least Recently Mounted (LRM) decision parameter. The relative weights of the LRU and LRM decision tests are varied responsive to measured changes in data access workload characteristics.

4 Claims, 8 Drawing Sheets

ADAPTIVE DEMOUNT PROCEDURE

FIG. 1   AUTOMATED LIBRARY HARDWARE

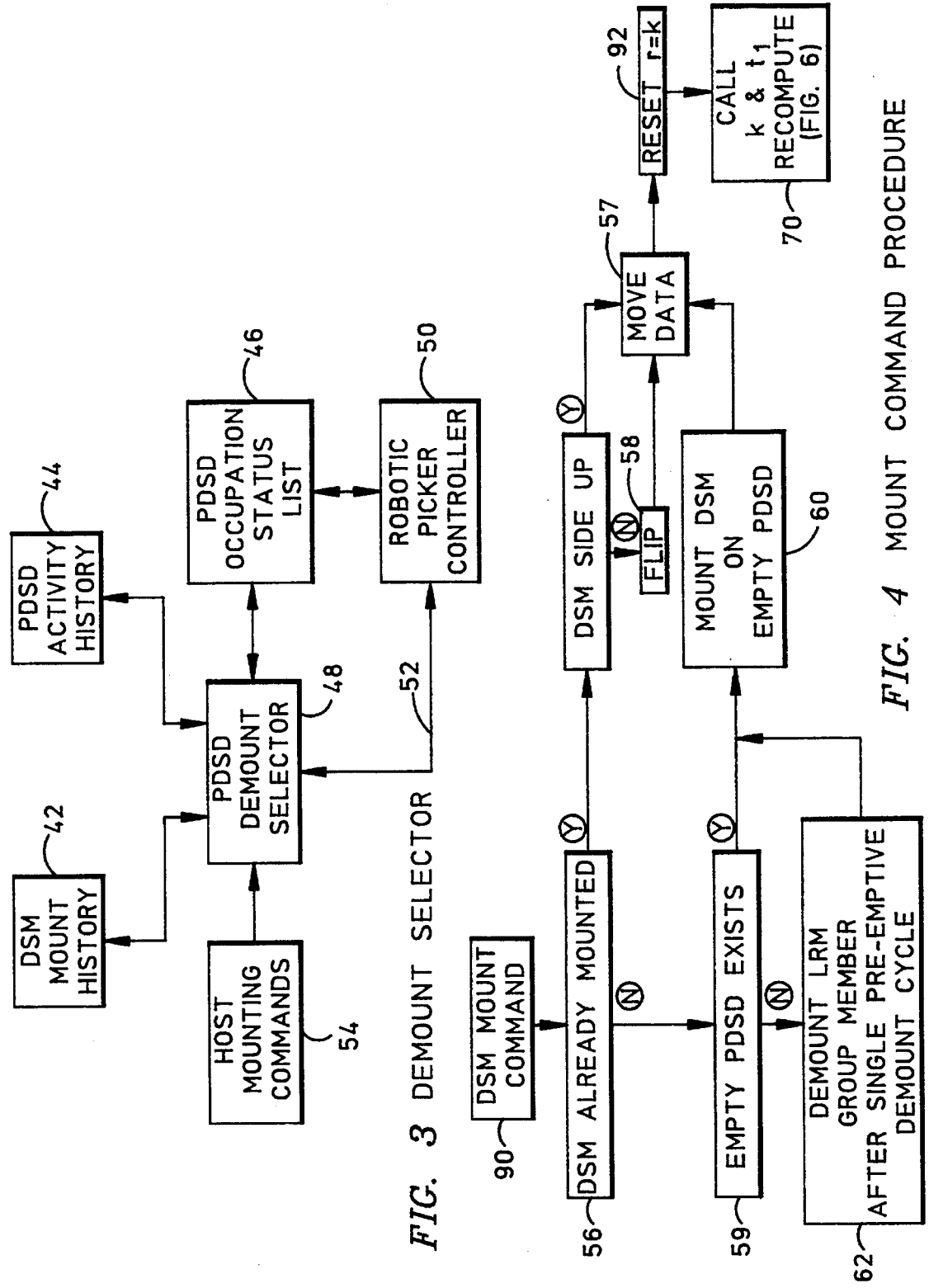

PRE-EMPTIVE DEMOUNT PROCEDURE

ADAPTIVE DEMOUNT PROCEDURE

SYSTEM FOR ADAPTIVELY OPTIMIZING AUTOMATED OPTICAL LIBRARY MANAGEMENT

BACKGROUND OF THE INVENTION

1. Field of the Invention

This invention relates generally to machine-executed methods for managing a mount request in an automated data storage library and, more specifically, to a method for efficient selection of demount candidates from among a plurality of fully-occupied peripheral storage devices.

2. Discussion of Related Art

Modern computer systems require ever-increasing data storage capacities. A larger storage capacity often increases the random data access time, reducing computer system efficiency. Data access time can be improved by introducing a hierarchical data store organization. The improvement arises from an organization employing a small fast data store at the highest or first storage level and slower stores of increasing size and access time at lower data storage levels in the hierarchy in a manner well-known in the art. Such hierarchical organization is useful for optimizing the capacity, speed, cost and expendability of a data store and the associated computer system.

Modern computer data stores require very high capacity elements at the lowest level of the data store hierarchy. The Direct Access Storage Device (DASD) offers medium capacity and access speed but is limited by its fixed capacity and is unsuitable for archival storage operations involving a flow of storage media through the store. The automated data storage library offers archival storage capability and unlimited expandability in exchange for reduced access speeds arising from media handling delays. An automated data storage library includes provisions for storing a large number of data storage media (storage "bins") and one or more internal Peripheral Data Storage Devices (PDSDs), each for reading and writing on a single Data Storage Medium (DSM) mounted thereon. At least one robotic DSM handler ("picker") is also included in the library system.

Practitioners in the art have suggested several improvements to automated data storage library systems intended for use in hierarchical data stores. These at first involved tape cartridge library systems and, more recently, optical disk libraries. The optical disk was first limited to a write-once medium, thereby providing a permanent read-only data store. Later improvements in optical disk technology have introduced the rewritable optical disk DSM. Thus, modern automated data storage libraries now offer similar performance options with either tape cartridges or rewritable optical disks.

Automated library systems can be indefinitely expanded by adding new DSMs to overcome capacity limitations but they also delay data access when switching DSMs at each of the several internal PDSDs. These delays arise from the DSM management overhead in the library, including delays introduced by movement of DSMs from storage bins to PDSDs and back again. Some systems provide only a single picker to service several PDSD. Thus, under many circumstances, access to data is slowed by the delay between an access command from the upper data store hierarchy and the loading of the necessary cartridge or disk on a PDSDs. This is less of a problem for sequential data access patterns than for the random data access patterns that are serviced by the DASD stores in the hierarchy.

Several automated data storage libraries are known in the art. IBM Corporation introduced the 3850 Mass Storage Subsystem for the storage and retrieval of magnetic tape modules in the 1970's. More recently, several firms have introduced automated data storage libraries for magnetic tape cartridges and optical disks. The picker mechanisms of these libraries include one or more grippers, each gripper capable of handling one DSM at a time. IBM has also introduced the 9246 Optical Library Unit, which employs a two-gripper picker.

Normally, a single DSM or data volume is demounted from a PDSD immediately after the access to it ceases or upon request for access to a new DSM. The procedure for selecting a PDSD for demounting in response to a request to mount a new DSM is critical to the overall data access efficiency of the automated library system. This decision process must consider the possibility of additional accesses to the DSMs already mounted in place on the PDSDs. If the system permits a mounted DSM to be demounted prematurely, significant unnecessary data access delays can result from repeated remounting and demounting ("churning") of DSMs. The character of this problem depends on whether the data access request stream is primarily sequential (e.g., batch transfers) or random (such as experienced in a system intended to emulate a DASD store).

Practitioners in the art have proposed several improvements to automated library systems to better balance capacity with speed. For instance, in U.S. Pat. No. 4,864,511, Michael E. Moy et al disclose a storage and retrieval subsystem employing an automated tape cartridge library having a split controller architecture that permits the library management controller to operate transparently to the host computer, thereby eliminating the host computer processing overhead associated with picker control.

In U.S. Pat. No. 4,864,438, Frederick G. Munro discloses an apparatus for managing tape cartridge movements in an automated cartridge library system that permits interconnection of two or more modular libraries so that tape cartridges can be interchanged among the modular libraries. Munro teaches a path selection system where a transit path through the multiple module library is reserved between the "home" point and "destination" point of a single tape cartridge. Once the path is selected, all intervening pass-through port slots are reserved in each library module along the path to ensure their availability for tape cartridge transportation. However, Munro does not consider the problem of efficiently resolving reservation conflicts involving the paths of several tape cartridges, other than by a simple First-In-First-Out (FIFO) priority scheme.

In U.S. Pat. No. 4,987,533, Connie M. Clark et al disclose a method for managing a storage hierarchy that includes an automated optical disk library. Clark et al teach a Least Recently Mounted (LRM) destaging decision method for destaging optical disks to an external manually-operated shelf storage. Clark et al suggest that, in an automated library system, the LRM technique is superior to the least recently used (LRU) technique known in the art for hierarchical store caching systems.

Christopher J. Monahan et al disclose a method for servicing a mount request for an automated data storage library in U.S. Pat. No. 5,121,483, which is entirely incorporated herein by this reference. Monahan et al teach a "virtual medium" method that permits the temporary demount of an active DSM that is subsequently remounted on any subsequently available PDSD. They also teach a preemptive demounting procedure that selects for preemptive demounting the LRM member of an "eligible subset" of all occupied PDSDs. Their "eligible subset" consists of all occupied PDSDs that are inactive longer than a predetermined time interval. However, Monahan et al neither consider nor suggest methods for dynamically optimizing their mount request servicing procedure in response to changes in the character of the data access request stream from the upper store hierarchy.

Modern large and midrange DASD stores are physically mounted at all times. Host operating systems for DASD stores do not provide for mounting and demounting delays, unlike tape system handlers. Optical libraries represent a new storage family having performance and costs midway between the tape storage systems and the high performance DASD stores known in the art. The cost and performance requirements for the optical PDSDs used in automated optical library systems discourage adding more than a few such drives to a given product. This cost-to-performance decision may change as the relative data access loads for automated library applications increase, but the present issues familiar to practitioners in the art require the rapid integration of optical libraries into existing data management systems. Such libraries must present a familiar and supported system image to the user and the host processor. DASD stores represent the most flexible and broadly applicable of the storage family candidates that are already fully supported by host systems. Accordingly, an optical library that simulates a DASD store fulfills a strongly-felt need in the art. However, simulating the appearance of permanently-mounted media in a PDSD-constrained environment is complicated by the high cost of multiple optical PDSDs and the slow pickers used to move optical DSMs to and from the PDSDs.

The IBM 3995 model 151 Automatic Optical Disk Library is a read-write optical library and is designed to emulate a 3390 DASD. Certain features of the model 151 are described in detail in "IBM Storage Subsystem Enhancements", IBM Doc. No. GG24-3886-00, IBM International Technical Support Center, San Jose, July 1992, pp. 107–146. DASD-emulation in an automated data storage library system introduces new problems for which solutions are unknown in the art. The typical workload directed to a DASD-emulating optical library consists of several different data-request streams, each having different characteristics. But random access requests and sequential access request streams appear to dominate the workload.

Random request streams result in frequent PDSD demounts and mounts, which implies heavy picker use and consequent dominance or "hogging" of the picker by these random streams. This dominance decreases the overall library access efficiency. Sequential request streams fill one DSM before demount and mount operations and thus do not increase mounting activity but do imply extended PDSD residency times. If the library controller fails to distinguish between random and sequential data access activity, a sequentially-accessed optical DSM cartridge will likely be prematurely demounted in favor of a recent random access mounting request. Such churning increases picker workload and reduces access efficiency.

Accordingly, there is a clearly-felt need in the art for improved methods of effective mount management in an optical library intended to emulate a DASD store. The related unresolved problems and deficiencies are clearly felt in the art and are solved by this invention in the manner described below.

SUMMARY OF THE INVENTION

This invention is a procedure for controlling a robotic picker mechanism used to mount and demount optical Data Storage Media (DSMs) from internal optical peripheral data storage devices (PDSDs) and for moving such DSMs between storage bin and drive bay. The procedure of this invention adapts demount selection to changes in the relative balance of sequential and random data access request streams and to changes in recent workload history.

It is an object of this invention to simultaneously optimize automated library servicing of both sequential and random data access request streams. This invention arises from the unexpected and advantageous observation that the LRU procedure tends to optimize the random data access workload and the LRM procedure imposes a "fairness" limitation on the LRU procedure that tends to give more uniform access to individual optical DSMs, thus optimizing the queue times in sequential data access workloads.

It is an advantage of this invention that such system performance optimization can be effected by a single mount management microcode process thread per robotic picker.

It is a feature of this invention that the demount decision process is workload-adaptive because it simultaneously optimizes random request stream throughput and sequential processing stream response time.

The demount selection method of this invention defines two control variables; a PDSD inactivity time interval threshold (t) and a preemptive demount loop count limit (k). Both threshold (t) and limit (k) are dynamically adjusted responsive to changes in workload characteristics. Threshold (t) is used to assign optical PDSDs to a group eligible for preemptive demount. The LRM drive within this preempt-eligible group is selected and preemptively demounted. Limit (k) is used to limit the number of cycles during which all optical PDSDs are tested for membership in the preempt-eligible group. If no preempt-eligible group members are located within (k) cycles, the preemptive demount operation is suspended until the next mandatory demount operation. A mandatory demount is initiated when a new optical DSM must be mounted and all optical PDSDs are occupied. The LRM of all optical PDSDs is selected for demount responsive to a mandatory mount request.

It is an advantage of this invention that the LRU and LRM techniques are combined and applied in a manner that optimizes the automated library servicing of both random and sequential data access streams. The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 3 is a schematic diagram of an illustrative embodiment of a preemptive demount selector of this invention;

FIG. 4 is a flowchart showing an illustrative embodiment of a mandatory mount command procedure of this invention;

DETAILED DESCRIPTION OF THE PREFERRED EMBODIMENTS

The Automated Data Storage Library

Figure 1:
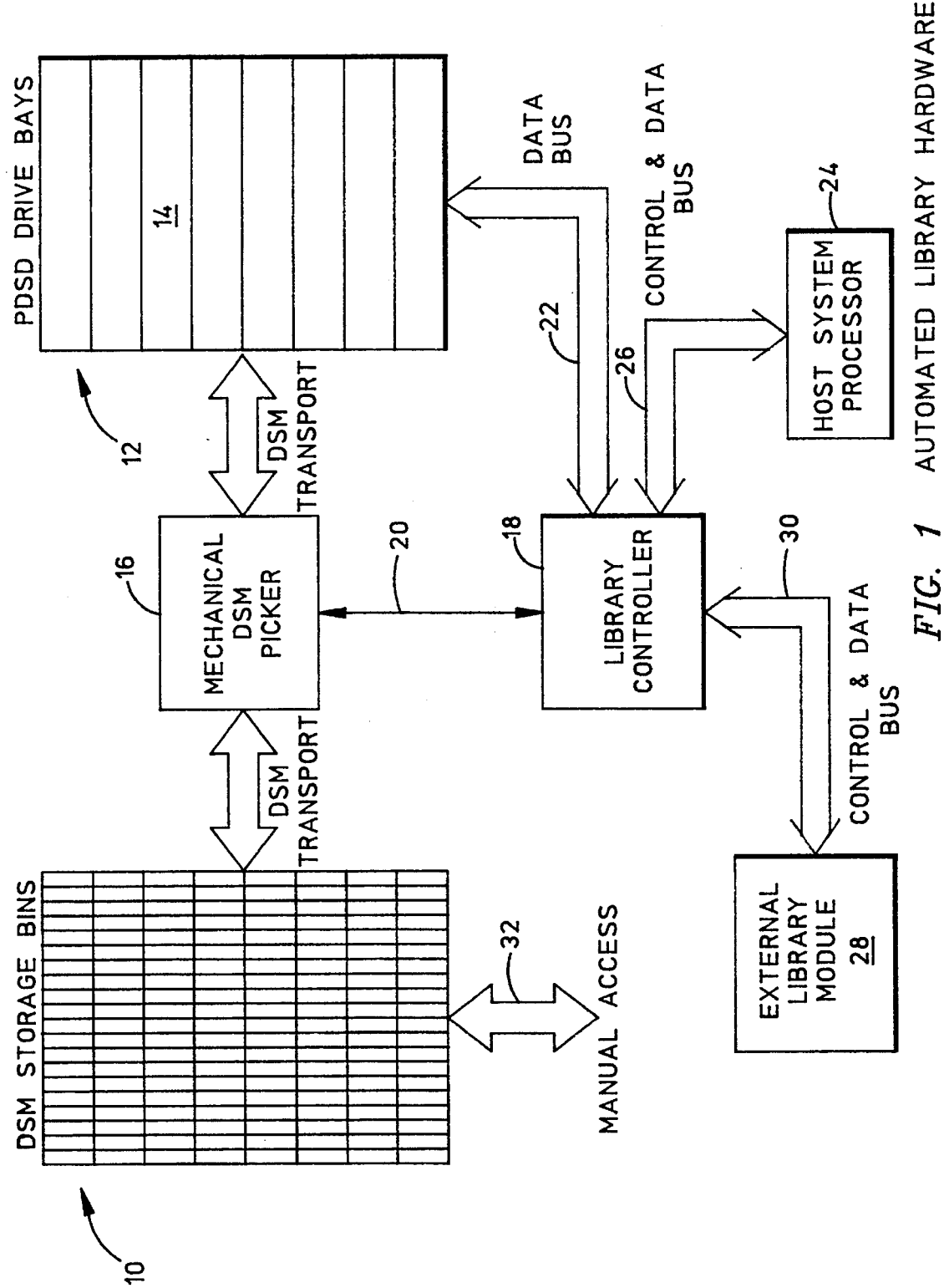
FIG. 1 is a schematic diagram of an automated library system.

The automated storage library of this invention is described in terms of an optical disk library embodiment that is itself described in detail in the above-cited U.S. Pat. No. 5,121,483. FIG. 1 shows a schematic diagram of an automated optical disk library. The library includes a plurality of Data Storage Media (DSM) storage bins 10. Each of the bins is disposed to store a single optical DSM cartridge (not shown) of any useful type known in the art. The library also includes one or more Peripheral Data Storage Device (PDSD) drive bays 12, each bay exemplified by the PDSD drive bay 14. Bay 14 is adapted for installation of any useful PDSD optical drive (not shown) known in the art. The mechanical DSM picker 16 is disposed within the automated library to transfer DSMs from storage bins 10 to PDSD drive bays 12 and back again. The operation of picker 16 is controlled by a library controller 18 with signals transferred over a control bus 20. Library controller 18 also transfers data from and to the drive bays 12 on a data bus 22 responsive to commands from the host system processor 24 received on a control and data bus 26. Processor 24 transmits and receives data from the library on bus 26 with the cooperation of library controller 18. Library controller 18 also integrates other library modules such as the external library module 28 through a control and data bus 30. Manual access to DSM storage bins 10 is provided at a port 32, permitting DSM cartridges to be loaded and removed from storage bins 10.

Figure 2:
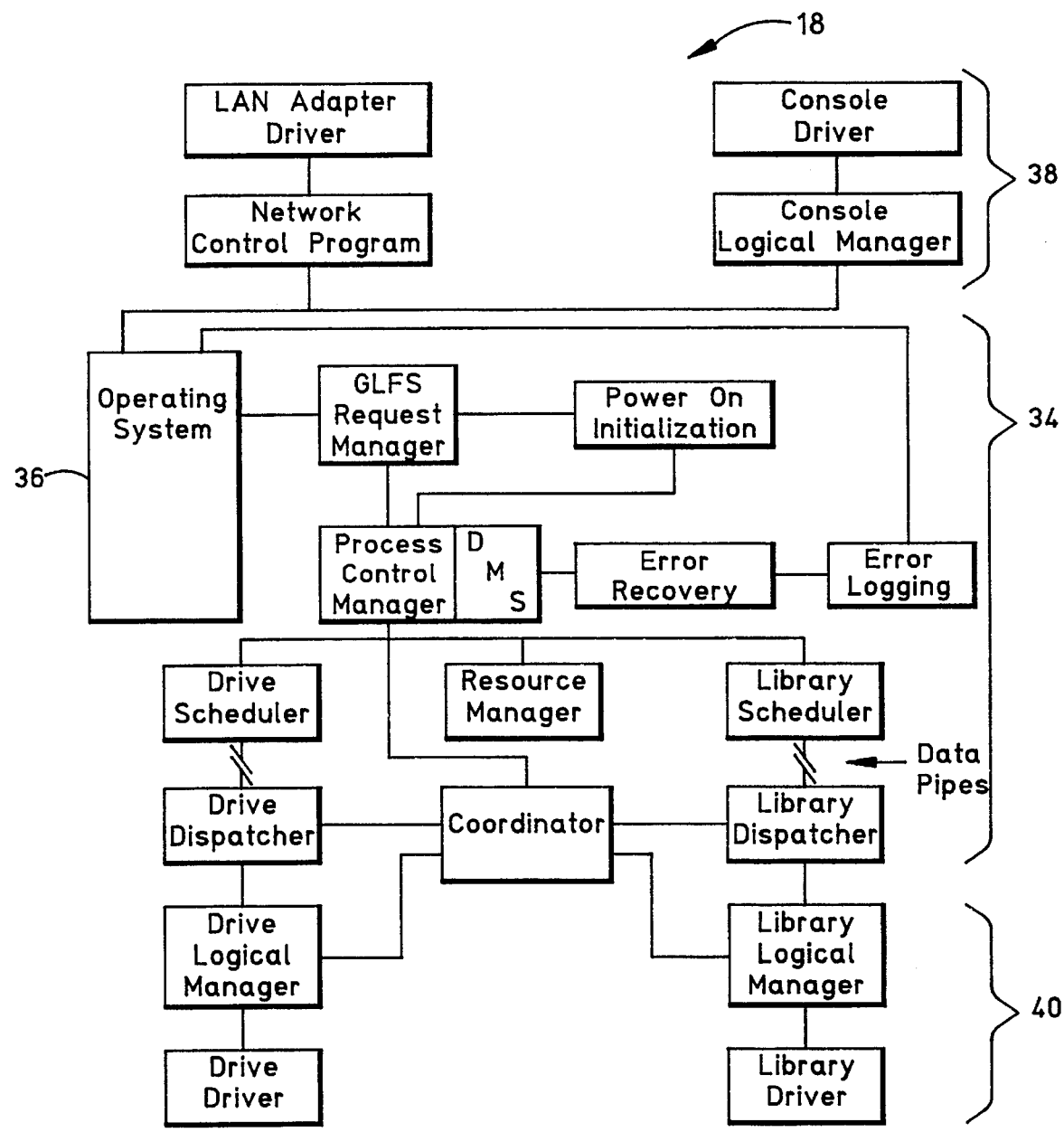
FIG. 2 is a block diagram of the data access controller of a system from FIG. 1.

FIG. 2 shows an embodiment of library controller 18 that is fully described in the above-cited U.S. Pat. No. 5,121,483. FIG. 2 provides a functional component level description of library controller 18, which is generally designed to support major library functions such as creating and deleting files, writing to and reading from files, moving DSM cartridges between storage bins 10 and drive bays 12 and providing statistics on usage and errors. Volumes in the library appear as subdirectories in the root directory of a single PDSD drive. Labels assigned to each volume represent the subdirectory name. Host system processor 24 is able to read the root directory but cannot store files in the root directory. Any paths accessed on a volume appear as paths under the subdirectory element that represents the volume label.

The above description is similar to the IBM Model 132 controller, which attaches via a Local Area Network. The IBM Model 151 controller attaches via a 370 channel and presents a different image to the attaching system. The IBM Model 151 appears as a permanently mounted DASD to the host while the IBM Model 132 does not, and the method of this invention is optimal for such a fixed DASD image. While such differences may lead to differing optimal mount management procedures, regardless of the use of adaptivity in these procedures, these differences are not material to the discussion herein of the method of this invention.

A Generic Library File Server (GLFS) 34 controls the library with a set of generic, intermediate hardware commands through a formally defined interface that is particularly described in the above-cited U.S. Pat. No. 5,121,483. Data is manipulated by GLFS 34 at the logic record level, allowing for data access in quantities ranging from a single byte to complete variable-length data objects. An operating system 36 mediates the flow of control and directs incoming operating system commands from the external host interfaces into the library subsystem. Operating system 36 can be any of several known operating systems but the OS/2 operating system is preferred. The OS/2 operating system generally allows for control of the library through standard fixed disk operating system commands. Most of the programmed control for the library is retained in microcode that is uploaded into the main memory of the host system processor 24 (FIG. 1) from a storage medium resident therein at initialization. In alternative embodiments, some functions necessary to support the microprogrammed control may also be provided as a utility to the operating system running in system processor 24. The OS/2 operating system concepts are more completely described in above-cited U.S. Pat. No. 5,121,483.

Briefly, in FIG. 2, an upper interface translator 38 is responsible for translating between upper interface commands and those of GLFS 34. The lower interface translator 40 is responsible for translating between the commands issued by GLFS 34 and those of the lower interface. Translators 38 and 40 are each implemented as distinct linkable modules with clearly defined interfaces, thereby permitting easy attachment of the automated library to new upper and lower interfaces. The only effect of attachment to a new interface is the creation of a new portion of translators 38 and 40; the generic nature of GLFS 34 permits it to remain unchanged upon expansion of translators 38 and 40. The upper and lower interface translators 38 and 40 and GLFS 34 are more particularly described in above-cited U.S. Pat. No. 5,121,483 and are included herein merely to provide background for the following description of this invention.

The Demount Selection Invention

This invention optimizes system performance using a single mount management microcode process thread (FIG. 8) per DSM picker 16. This process thread is specifically workload-adaptive and simple in design. It is workload-adaptive in that it seeks to simultaneously optimize throughput for a random request workload stream and optimize response time for specially localized or sequential processing. All control algorithms are preferably implemented as OS/2 applications written in the C language. The mount management thread (LIBrary CoORDinator or LIBCORD) communicates with the staging control threads (STAGE and DESTAGE, not shown) and with the robot control thread (MOVOPTIC, not shown) which itself controls the physical movement of the DSM picker 16 by translating incoming requests from host system processor 24 (FIG. 1) to their SCSI command packet equivalents and issuing the SCSI commands to the mechanical DSM picker 16 on bus 20 (see FIGS. 8–9). For each channel interface and 3390 unit address, there is one primary OS/2 thread performing CCW chain management, including the calling of the reentrant STAGE and MOVOPTIC routines. This process can be appreciated by referring to the above-cited U.S. Pat. No. 5,121,483.

FIG. 3 provides a basic schematic representation of an illustrative embodiment of the demount selection apparatus of this invention. The DSM mount history list 42 identifies the most recently mounted DSMs. The PDSD activity history list 44 maintains a moving record of the access activity for each PDSD in the library. The PDSD occupation status list 46 provides the identity of all empty PDSDs. The PDSD demount selector 48 of this invention uses the contents of lists 42, 44 and 46 to create commands to a robotic picker controller 50 via the bus 52. Selector 48 also responds to mounting commands 54 from host system processor 24 in a manner to be described below.

The following describes the essential transaction and mount management features employed by the method of this invention to satisfy an incoming read or write request.

Request Arrival Management

Figure 7:
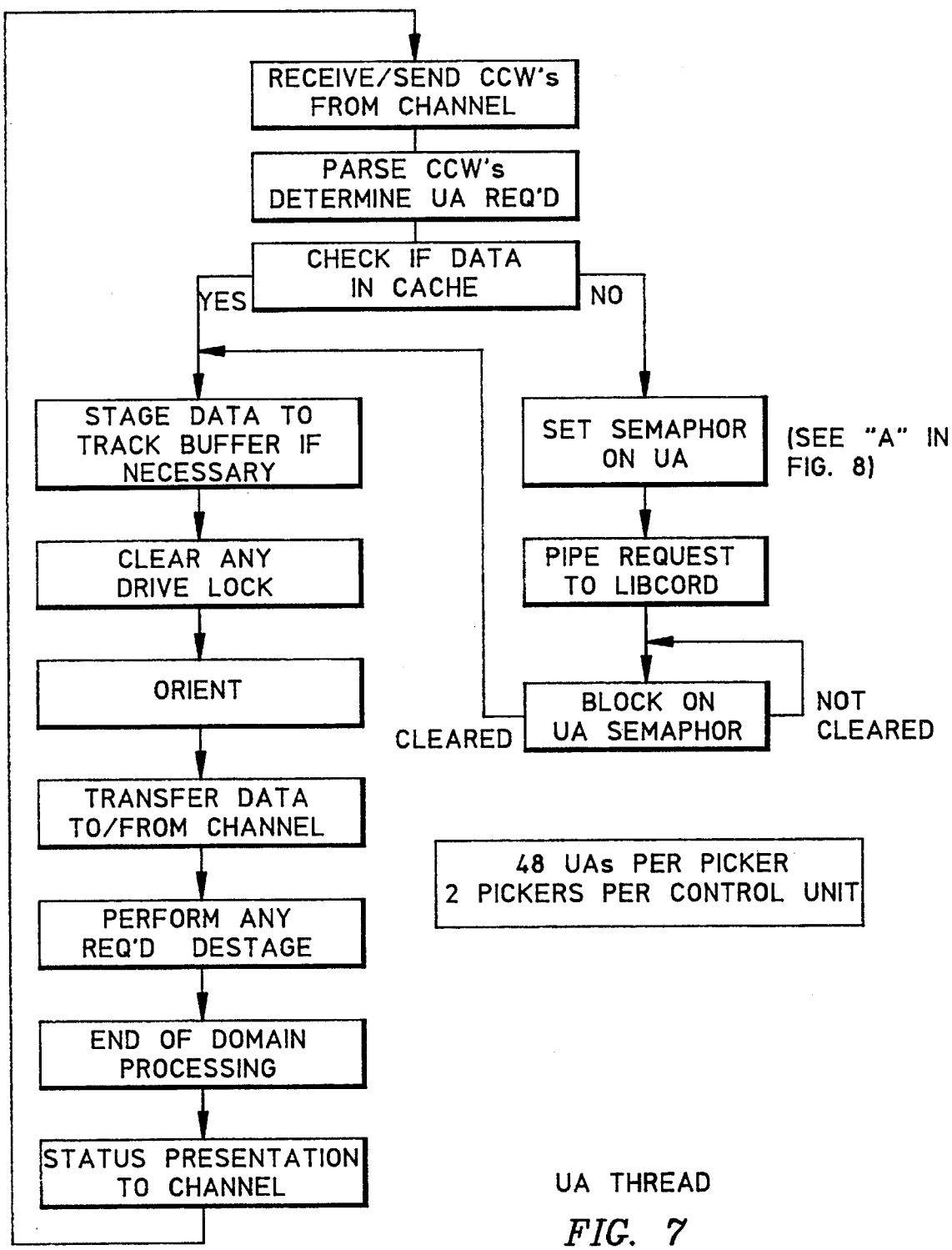
FIG. 7 shows a preferred embodiment of a Unit Address (UA) thread procedure of this invention.

The automated library of this invention, as exemplified by the IBM 3995 Model 151 DASD Emulator, appears to the host's applications as a slow 3990 model 2 with 3390 DASD under it. This library receives a 3990-compatible CCW chain and, during the processing of the seek or locate record command, obtains the unit address of the desired 3390-like device, including the cylinder, head and records specifications of the date of location (FIG. 7). This discussion assumes that open processing has already occurred so that the VTOC or VVDS optical cache information in host processor 24 has already been accessed. The mechanism for mapping the host reference to a 3390 unit address, cylinder, track and record specification to an optical DSM surface and Logical Block Address (LBA) is executed by library controller 18 (FIG. 1). If the request cannot be satisfied either in a controller memory track buffer (not shown) or in a permanently mounted optical DSM cartridge cache (not shown), the 3390 unit address-associated OS/2 thread then writes the unit address to the OS/2 pipe defined for the LIBCORD library-associated thread.

Mount Management and Drive Selection

The LIBCORD thread (FIGS. 8–9, for example), which has been blocked waiting for something to read in the OS/2 pipe, now awakes and reads the unit address for which a DSM cartridge should be mounted. Using the unit address, this thread indexes into a global Unit Address Control Block (UACB) to obtain all of the key parameters required for the read, such as the correct DSM cartridge and the correct side of the DSM cartridge. Although the following discussion is written from the perspective of a read request, write requests are handled similarly except that destages may be required. The same logic applies, replacing STAGE with DESTAGE.

The central element of the method of this invention is the following procedure for determining on which PDSD drive that the specified DSM cartridge is to be mounted. The sequence of steps for the method of this invention in response to a specific mount request is illustrated in FIG. 4 and described as follows:

1. Determine if the required DSM is currently mounted in a PDSD. If mounted on the correct side, then get a lock on the PDSD and stage data to the track buffer via bus 22 (step 57). If mounted on the opposite side, then get a lock on the PDSD and request mechanical DSM picker 26 to flip the DSM (step 58) and follow this with the track buffer data staging.

2. If the correct DSM is not currently mounted in any PDSD, then look for an empty PDSD (step 58). If any empty PDSD is found, lock on that drive and request picker 16 to mount the requisite DSM (step 60) and, when mounted, stage data (step 57) to the track buffer on bus 22.

3. If the correct DSM is not currently mounted in any PDSD and if all PDSDs are currently occupied by other DSM mounts, then select a drive for demount (step 62) according to the following procedure illustrated in FIG. 5.

a. Determine a group of PDSDs eligible for demount (step 64). Each PDSD is examined for membership in this group. Any PDSD that has not had I/O activity in the last $t_1$ seconds (e.g. $t_1=3$ seconds) based on the statistics maintained in an active device control block (DEVCB), is added to the group. Thus, demount eligibility is determined on a progressive Least-Recently-Used (LRU) basis. The PDSDs satisfying this LRU criterion are most likely currently mounted with DSMs for which only a few random accesses were made and no more such accesses are likely in the near term; therefore, demounting one of these eligible PDSDs will not likely affect system or job performance efficiency.

b. If the demount eligible group has any members (step 66), then select the PDSD from the group that is Least Recently Mounted (LRM) (step 68). Lock this PDSD, schedule it for demount and enter the identity of the DSM to be demounted in the demount rolling history table 42 (FIG. 3) and mount the selected DSM onto the demounted PDSD immediately following the demount operation. This LRM selection from the LRU group of eligible PDSDs acts to enforce some fairness in PDSD resource allocation. The oldest randomly accessed DSM is preferentially demounted as is the very long running intermittently sequentially accessed DSM.

c. If the eligible demount group has no member, then redefine this group to include all PDs in the library (step 64). Again choose the LRM member of the redefined group for immediate demount, update table 42, and mount the selected DSM. In this situation, it is likely that at PDSDs are dominated by sequential data access activity, so the longest resident drive is therefore preempted.

4. Clear the unit address semaphore in the UACB for the mounted DSM, but leave the PDSD drive unlocking procedure to the calling routine (STAGE or DESTAGE).

Figure 5:
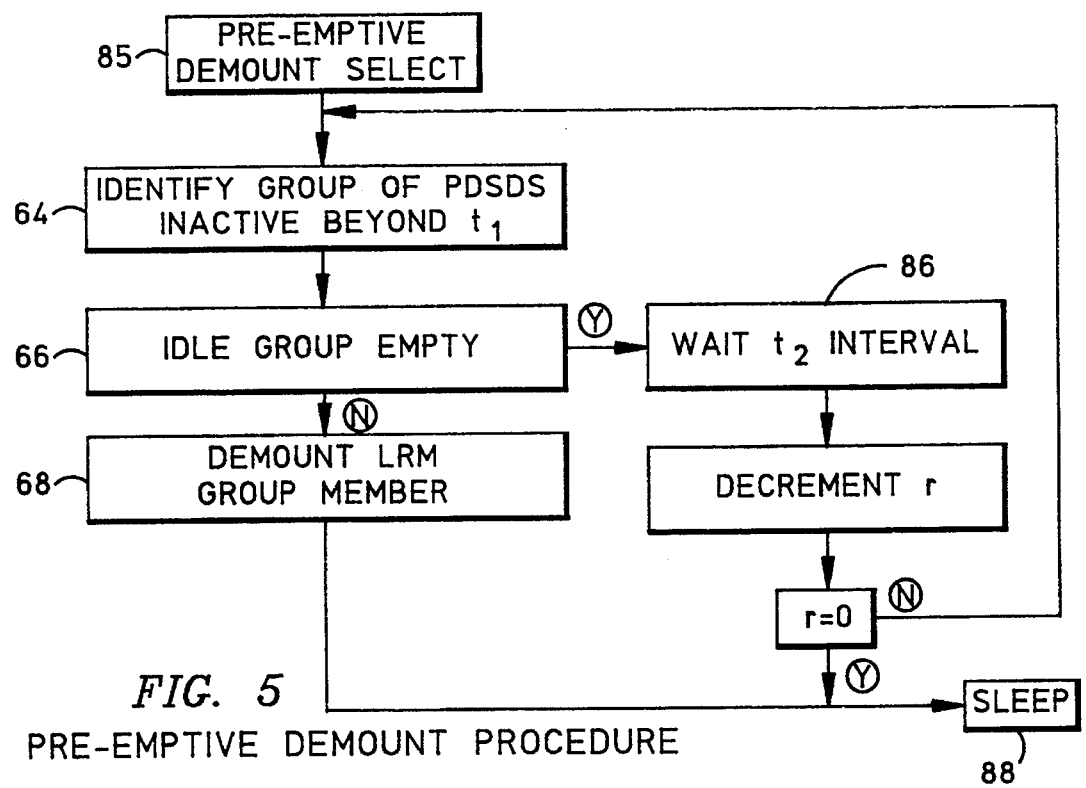
FIG. 5 is a flowchart showing an illustrative embodiment of a preemptive demount procedure of this invention.

The preceding procedure illustrates the method of this invention for selecting a demount PDSD candidate in response to a mandatory mount command from host processor 24. The method of this invention also includes a preemptive demount procedure that is shown in FIG. 5 and described below.

Asynchronous Demount Management

Figure 6:
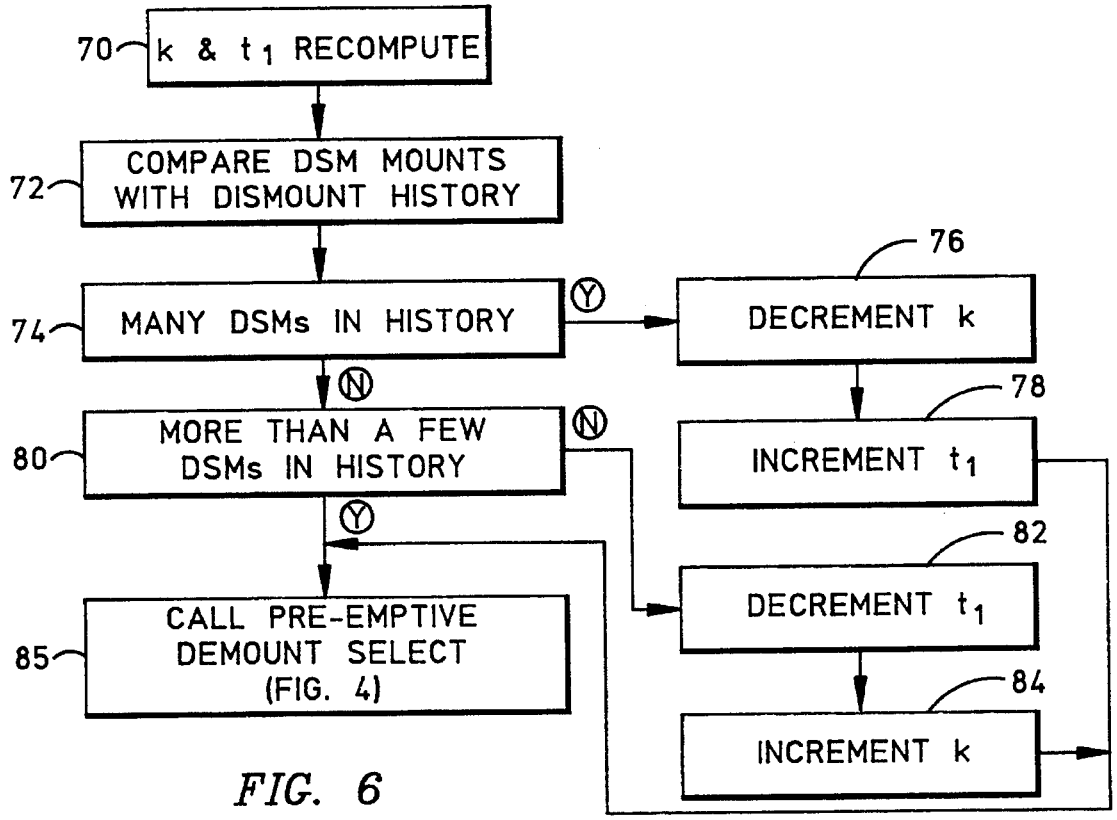
FIG. 6 is a flowchart showing an illustrative embodiment of an adaptive demount procedure of this invention.

Once the mandatory mount request (FIG. 4) is satisfied but before forwarding new requests in the pipeline to LIBCORD from STAGE or DESTAGE, the LIBCORD microcode now proceeds through a repetitive loop (FIG. 9 for example) to identify a mounted DSM that is likely to remain inactive and therefore is a prime candidate for preemptive dismounting. The advantage of this procedure is that a succeeding mandatory mount request can then be satisfied without having to wait for a demount. Depending on system activity, incoming transactions experience anywhere from no wait on the demount (low activity) to nearly a full wait (highest activity). This preemptive demount activity does not reduce the utilization of picker 16 nor does it increase system throughput, but is does reduce transaction response time. Additionally, LIBCORD performs an adaptive adjustment of two constants (FIGS. 6 and 9) as part of the drive selection procedure. These are the idle time interval threshold ($t_1$) described above and the cycle limit number (k) described below. The asynchronous procedure is as follows.

1. Reset a cycle counter (r) to the current value of (k) and recalculate the limit number (k) and the idle threshold ($t_1$) to adapt to workload changes (step 70 in FIGS. 6 and 4). This is accomplished by first checking demount history list 42, which contains the most recent dismounted DSM side identities. Compare these against PDSD status list 46 that has the current mounted DSM side identities (step 72). If three or more of the list 42 entries are matched in list 46, then (k) and ($t_1$) should be adjusted to more aggressively favor sequential activity and to minimize wasteful churning (step 74). Therefore, decrease (k) by one in step 76 (to a minimum of zero, which then permits all sequential jobs to proceed uninterrupted absent a mandatory mount request) and increase ($t_1$) by one second in step 78, thereby making the eligible demount pool smaller and favoring preemptive dismount of DSMs that are not being sequentially accessed. If no more than one of the current mounted DSMs is found in list 42 (step 80), then random access is dominating and should be more aggressively favored. To favor random access, decrease (step 82) idle threshold ($t_1$) by one second (to a minimum of $t_1$=1 second) and increase cycle limit (k) by one (step 84). Decreasing $t_1$ tends to increase the size of the eligible demount PDSD group mounted with DSMs experiencing sequential activity. If exactly two currently mounted DSMs are among the list 42 entries, then leave (k) and ($t_1$) unchanged.

2. Call step 85 in FIG. 5 to recalculate (step 64) the eligible group of PDSDs. If all PDSDs have been accessed within ($t_1$) seconds (step 66), then wait ("sleep") for a predetermined interval ($t_2$=one second) in step 86.

3. After $t_2$ seconds, repeat step 64 and recalculate the members of the eligible demount group. Continue this loop for (r) repetitions or until the first member of the demount eligibility group is identified, whichever occurs first. This permits truly active jobs to fully use the available PDSDs without premature preemption. Begin with k=7 as a useful initial preset value. As soon as the eligibility group is found to have members in step 66, then select the LRM member from the group in step 68 and schedule it for demounting.

4. After either dismounting a DSM currently selected or failing to find any members of the eligible group of PDSDs in (k) successive cycles, pause and wait for a new request from the pipeline at step 90 in FIG. 4. A new request separate cycle counter variable (r) from zero to the current value of (k) at step 92 and begins the cycle through steps 70 to 85 again.

Figure 8:
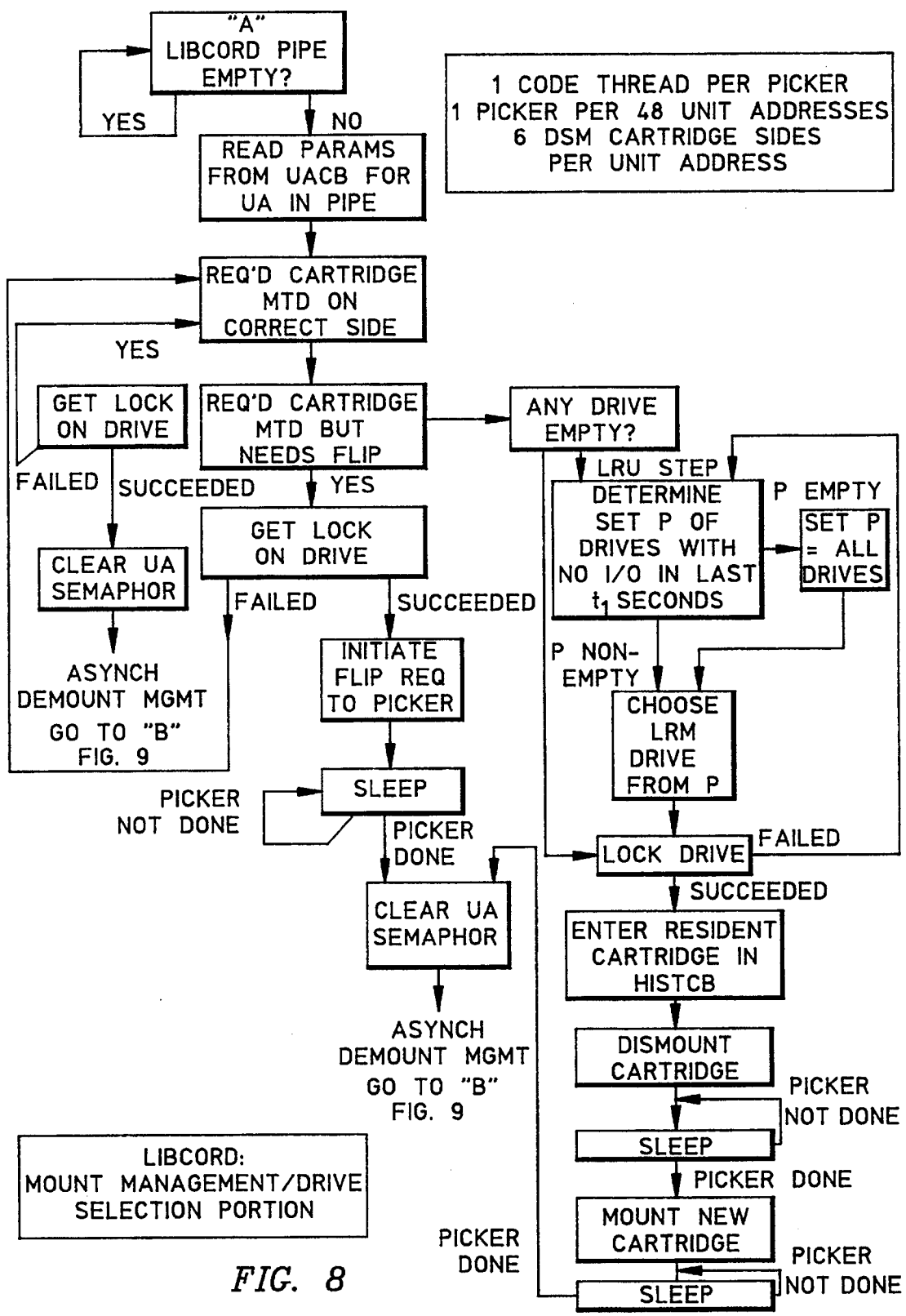
FIG. 8 shows a preferred embodiment of a Mount Management process thread procedure of this invention.
Figure 9:
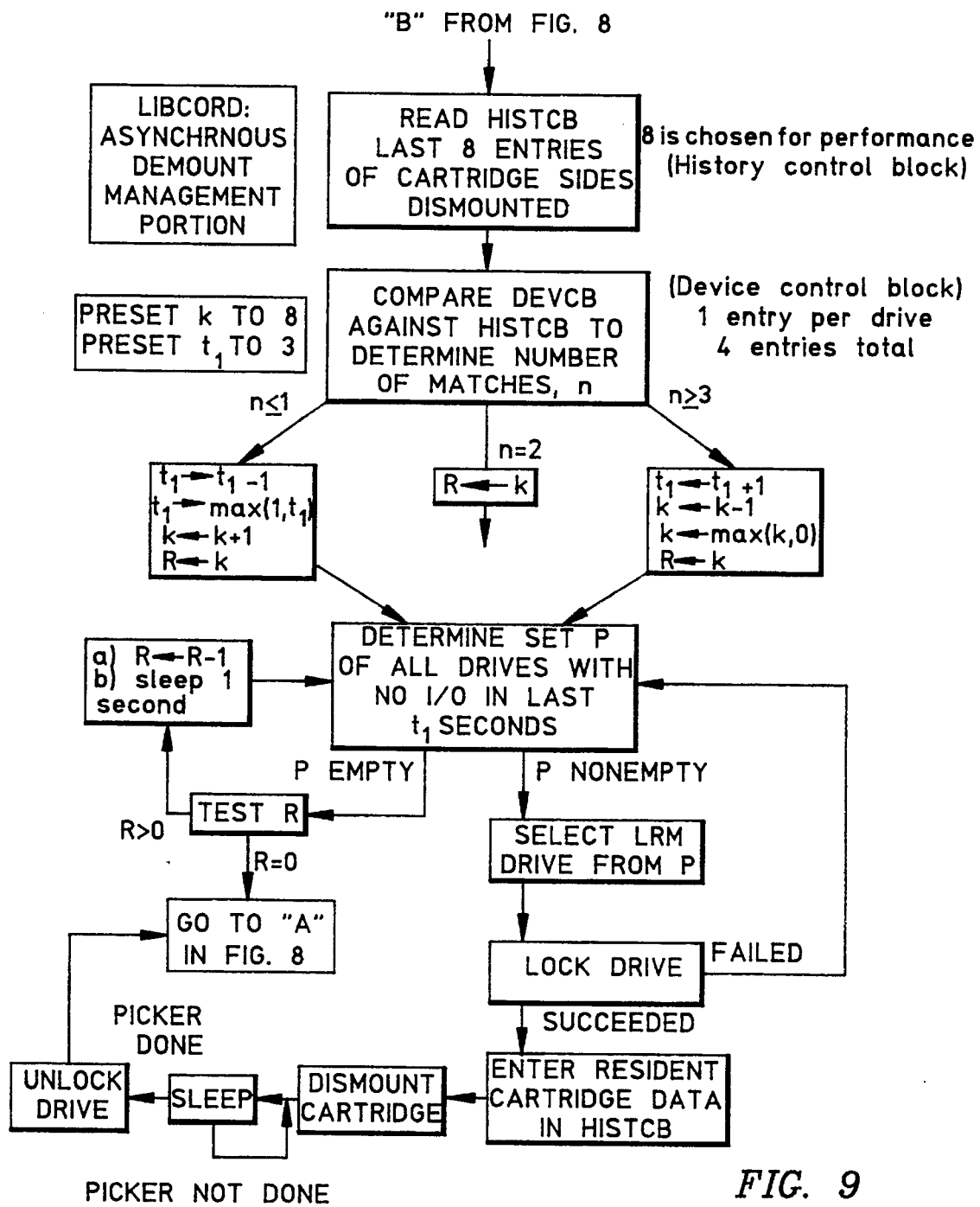
FIG. 9 shows a preferred embodiment of an Asynchronous Demount Management thread procedure of this invention.

FIGS. 7–9 show a preferred embodiment of the microcode threads invention as implemented for the IBM 3995 Model 151 Automated Optical Disk Cartridge Library. The operation of the procedural embodiment shown in FIGS. 7–9 can be readily appreciated with reference to the above discussion in connection with FIGS. 4–6 because the two embodiments differ only in nonessential details.

Figure 10:
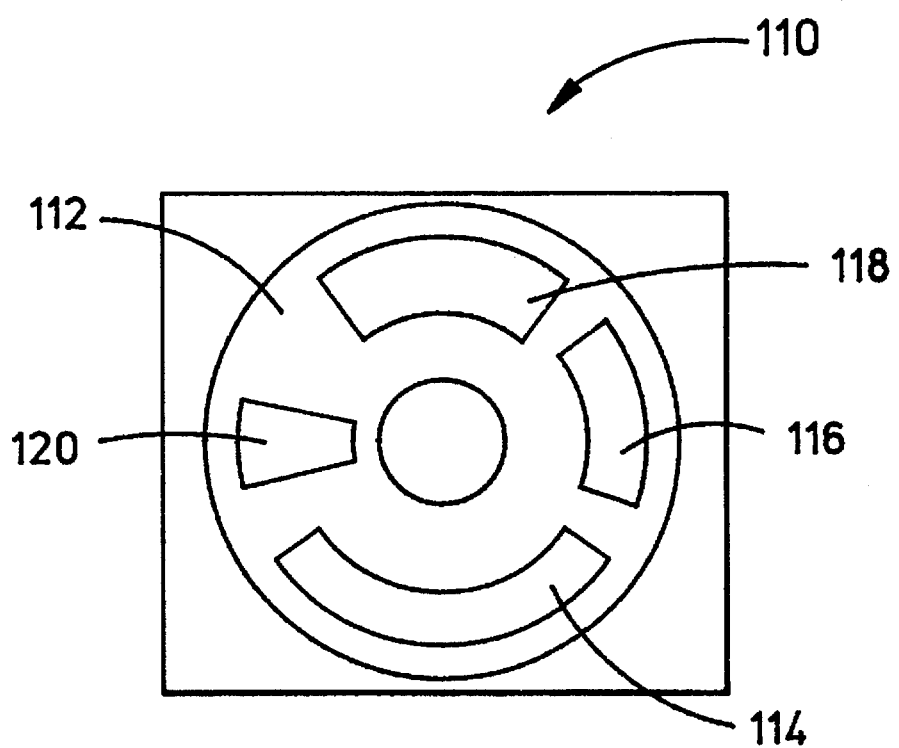
FIG. 10 represents an exemplary floppy disk medium embodying a computer program product in accordance with this invention.

While the automated optical library management system of this invention is primarily disclosed as a method, it is understood by all persons of ordinary skill in the art that an apparatus, such as a conventional data processor, including a CPU, memory, input/output, program storage, a connecting bus and other appropriate components, could be programmed or otherwise designed to facilitate the practice of the method of this invention. For instance, host system processor 24 (FIG. 1) might include such elements as necessary to implement any of the methods of this invention. Also, an article of manufacture, such as the pre-recorded floppy disk 110 in FIG. 10 or other similar computer program product for use with a data processing system, could include a storage medium 112 and particular program means such as program objects 114, 116, 118, and 120, recorded thereon for directing the data processing system in host system processor 24 (FIG. 1) to facilitate the practice of any of the methods of this invention. It is understood by any practitioner skilled in the art that such apparatus and articles of manufacture also fall within the spirit and scope of this invention.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for selecting one of a plurality of data storage media (DSMs) for demount from one of a plurality of peripheral data storage devices (PDSDs) in an automated data storage library, having means for mounting a requested said DSM responsive to at least one mounting command, wherein said automated data storage library includes discriminator means for discriminating between random data access operations and sequential data access operations, each said PDSD being for storing or accessing data in at least one said DSM mounted thereon, said method comprising the unordered steps of:

(a) determining the idle time interval (Ti) since the last access for each said PDSD;

(b) assigning to a demount candidate group each said PDSD for which said idle time interval ($T_i$) is not less than a first predetermined time interval threshold ($t_1$);

(c) if said demount candidate group has one or more members, selecting the least recently mounted (LRM) said member for immediate demount, otherwise:

(d) per:forming said steps (a)–(c) again after a predetermined second time interval ($t_2$); and (e) halting said method after a limit number (k) of consecutive repetitions of said performing step (d) over a continuous retry time interval during which said conditional selecting step (c) is not performed:

(f) selecting the LRM said PDSD for demount responsive to said mounting command if said demount candidate group has no members:

(g) modifying said first predetermined time interval threshold ($t_1$) and said predetermined limit number (k) responsive to said discriminator means;

(h) comparing the DSMs mounted in said PDSDs to a dismount history list to determine a degree of commonality (z), wherein said dismount history includes a list of a plurality of said DSMs that were previously dismounted; and (i) revising said first predetermined time interval threshold ($t_1$) and said predetermined limit number (k) responsive to said degree of commonality (z), whereby the effects of said method are adjusted for changes in data access patterns.

2. The method of claim 1, wherein said revising step (i) includes the steps of:

(i.1) increasing said first predetermined time interval threshold ($t_1$) and increasing said predetermined limit number (k) responsive to a low-valued said degree of commonality (z); and (i.2) decreasing said first predetermined time interval threshold ($t_1$) and decreasing said predetermined limit number (k) responsive to a high-valued said degree of commonality (z).

3. A method for selecting one of a plurality of data storage media (DSMs) for demount from one of a plurality of peripheral data storage devices (PDSDs) in an automated data storage library, having means for mounting a requested said DSM responsive to at least one mounting command, each said PDSD being for storing or accessing data in at least one said DSM mounted thereon, wherein said automated data storage library includes discriminator means for discriminating between random data access operations and sequential data access operations, said method comprising the unordered steps of:

(a) determining the idle time interval ($T_i$) since the last access for each said PDSD;

(b) assigning to a demount candidate group each said PDSD for which said idle time interval ($T_i$) is not less than a first predetermined time interval threshold ($t_1$);

(c) if said demount candidate group has one or more members, selecting the least recently mounted (LRM) said member for immediate demount, otherwise;

(d) performing said steps (a)–(c) again after a predetermined second time interval ($t_2$); and (e) halting said method after a limit number (k) of consecutive repetitions of said performing step (d) over a continuous retry time interval during which said conditional selecting step (c) is not performed:

(f) modifying said first time interval threshold ($t_1$) and said limit number (k) responsive to said discriminator means:

(g) comparing the DSMs mounted in said PDSDs to a dismount history list to determine a degree of commonality (z), wherein said dismount history list includes a list of a plurality of said DSMs that were previously dismounted; and (h) revising said first time interval threshold ($t_1$) and said number (k) responsive to said degree of commonality (z), whereby the effects of said method are adjusted for changes in data access patterns.

4. The method of claim 3, wherein said revising step (h) includes the steps of:

(h.1) increasing said first time interval threshold ($t_1$) and increasing said limit number (k) responsive to a low-valued said degree of commonality (z); and (h.2) decreasing said first time interval threshold ($t_1$) and decreasing said limit number (k) responsive to a high-valued said degree of commonality (z).

* * * * *

UNITED STATES PATENT AND TRADEMARK OFFICE
CERTIFICATE OF CORRECTION

PATENT NO. : 5,566,348
DATED : October 15, 1996
INVENTOR(S) : Dahman et al.

It is certified that error appears in the above-indentified patent and that said Letters Patent is hereby corrected as shown below:

COVER PAGE, item

[22] change "Oct. 22, 1995" to --Oct. 22, 1992--.

Signed and Sealed this

Twenty-fourth Day of June, 1997

Attest:

BRUCE LEHMAN

*Attesting Officer*  *Commissioner of Patents and Trademarks*